UNITED STATES PATENT OFFICE.

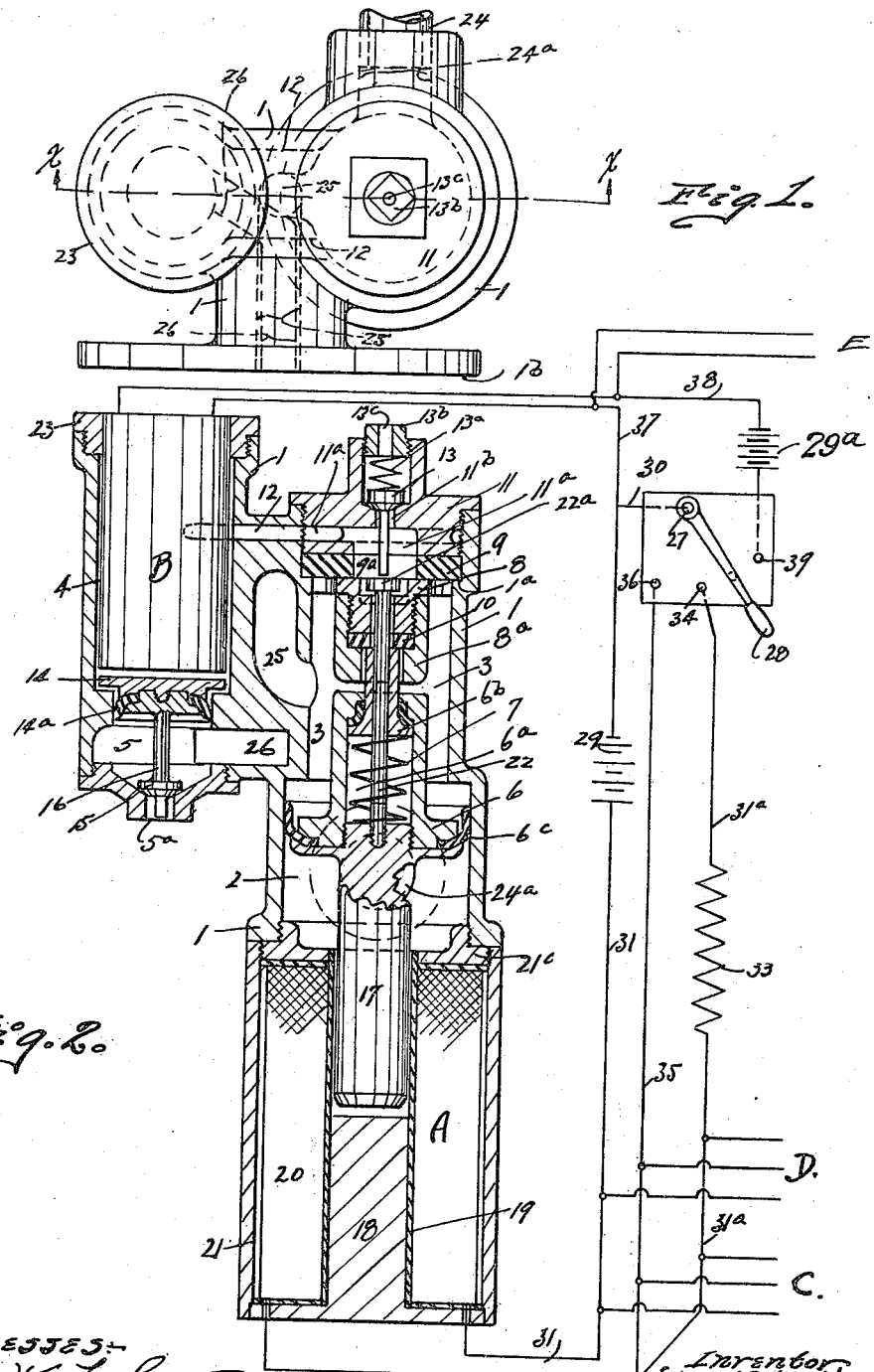

EDWARD R. HUMPHREY, OF VICTORIA, BRITISH COLUMBIA, CANADA, ASSIGNOR TO SAFETY FIRST AIR BRAKE COMPANY (CANADA) LIMITED, OF VICTORIA, CANADA.

ELECTROMAGNETIC AIR-BRAKE.

1,203,877.     Specification of Letters Patent.     Patented Nov. 7, 1916.

Application filed September 23, 1914.   Serial No. 862,066.

*To all whom it may concern:*

Be it known that I, EDWARD R. HUMPHREY, a citizen of the Dominion of Canada, and resident of Victoria, British Columbia, Canada, have invented certain new and useful Improvements in Electromagnetic Air-Brakes, of which the following is a full, true, and exact specification.

My invention relates to air brakes and has for its principal object to provide an electrically operated triple valve by which it is possible to make both ordinary service and emergency application of the brakes, and also to release such application.

In my improved triple valve all the operation necessary to make application of the brakes may be performed either by an electrically controlled mechanism or simply by the usual air-pressure system at present well known in the art, as, for example, the well-known Westinghouse triple valve. It is thus seen that my improved triple valve converts the ordinary air-brake system into an air-brake system having a dual mechanism and control, and the advantages of a dual mechanism are obvious.

My mechanism provides a means whereby all the triple valves in the train may be operated instantly and simultaneously, due to the fact that an electrical current travels much more rapidly than the variations in air pressure, as in the present system.

My triple valve is interchangeable with any of the present forms of triple valves in general use.

A further advantage may be stated as a saving in the amount of air used in making the application, as will be shown presently.

The brake cylinder, the compressor, air retainer, tanks, train pipe, connections and, in fact, all the mechanism other than the triple valve and electrical connections are the same in the system of which my device is a part as in the Westinghouse system which is so well known as to need no particular description here.

Other advantages will be apparent as my invention is more fully described in the following specifications, illustrated in the accompanying drawings and pointed out in the appended claims.

The principal function of the electrical feature of my invention is that an instantaneous effect of the straight air is possible; that is to say the air which comes direct from the main source, and also that by an electrical emergency application all the pressure upon the entire train is availed of.

In the drawings, Figure 1 is a plan view of my improved triple valve. A wiring diagram is also shown in Fig. 2. Fig. 3 is a side elevation and half section of a coupling for making the wire connections from car to car.

Referring now more particularly to Figs. 1 and 2 of the drawings, numeral 1 designates a valve body which is chambered as at 2 and 3, 4 and 5, the chambers 2 and 3 being separated by a piston valve 6 which is bored as at $6^a$ to receive a secondary piston valve $6^b$ and spring 7. The chamber 3 is closed at its upper end by a piston 8 which is held against a gasket 9 by the spring 7, the said spring acting against the secondary piston $6^b$, which, in turn, reacts against a gasket 10 located between the piston 8 and its outer thimble $8^a$. The gasket 9 is centrally bored as shown at $9^a$ and is seated upon the ledge $1^a$ in the body 1, being held to the seat by a plug 11 which screws into an opening in the body 1. The plug 11 is bored as at $11^a$ and $11^b$, the former being connected with the chamber 4 through a passage 12 in the body 1 and the latter being normally closed by a valve 13 which is held in its seated position by a spring $13^a$ of sufficient strength to hold valve 13 seated against the maximum brake cylinder pressure, and a bushing $13^b$, which has an opening $13^c$. Chambers 4 and 5 are separated by a valve 14 which is rigidly connected to an exhaust valve 15 by a stem 16. The exhaust valve 15 closes the chamber 5 from its vent $5^a$ through which the brake cylinders are exhausted to the outer air. Valves 6 and 14 are provided with cup leathers $6^c$ and $14^a$, respectively, the leathers being designed so as to allow the air to pass them in one direction only. The piston valve 6 is provided with a plunger 17 which passes centrally into a magnetic coil A and within the field of the core 18 of the said coil. The coil A is composed of a core 18, spool 19, windings 20 and casings 21, the latter being secured to the body 1 by the bushing $21^a$. The coil A operates the piston valves 6 and $6^b$ and the piston 8 by means of a pin 22, having a head $22^a$. The said pin passes centrally through loosely fitting holes in the piston 8, thimble 8ᵃ, valve 6ᵇ and the coil spring 7, and is secured into the plunger 17. An additional function of the pin 22 is to open the valve 13. The valve 14 is provided with an electrically operating coil B which is of the usual soft core type, the said valve forming an armature. The coil B is located within the chamber 4, being joined to the body by a bushing 23, all of which is clearly shown in Fig. 2. The chamber 2 connects with the train pipe 24, through the port 24ᵃ, while chamber 3 connects with an auxiliary air tank (not shown) by means of a port 25, and the chamber 5 is connected to the brake cylinder by a port 26. The body 1 terminates in a flange 1ᵇ on one side, and the said flange bolts directly to the brake cylinder in the usual manner.

Referring now particularly to the wiring diagram in Fig. 2, a control switch-board 27 (preferably located in the engineer's cab) is equipped with a four-way switch 28 which may be so thrown as to close the circuit between the coil A or B and sources of current 29 29ᵃ, respectively. Wires 30, 31, 31ᵃ and 32, together with a resistance coil 33, form a circuit which when closed by throwing the switch 28 to a point 34 moves the triple valve into an ordinary service position. The wires 30, 31, 32 and 35 form a circuit which when closed by throwing the said switch to a point 36 moves the triple valve into an emergency position. The last mentioned circuit is stronger than the previously mentioned one because no resistance is used, and the effect of more current is to draw the plunger 17 nearer to the core 18 than is possible with a lesser current. Wires 30, 37 and 38, together with the coil, B, form a circuit which when closed by throwing the switch 28 to the point 39 causes the said coil to move the valve 14 upwardly, which opens the valve 15 and thereby allows the brake cylinder to discharge through the passage 26 and vent 5ᵃ, thus releasing the brake. This is what is known as release position. The switch 28 is shown in what is known as holding position in Fig. 2. The diagram shows additional connections at C, D and E which represent similar circuits to the above described ones, all of which are connected in multiple. Circuits C, D and E operate the various coils on the triple valves on other cars of the train.

The triple valve as shown in Fig. 2 is in running position, at which time the following conditions exist:—The auxiliary tank and chamber 3 are charged to the usual pressure, that is to say the same as the train line, no appreciable pressure being held beyond the piston valve 8. In order to make a light application of the brakes, or what is known as a service application, using the usual methods only, the train line is vented slightly (5 to 10 pounds) which reduces the pressure below the valve 6 sufficiently to allow the greater pressure in the chamber 3 and the tank to force the valves 6 and 6ᵇ downward until stopped by the head 22ᵃ of the pin 22, which strikes the valve 8. The above movements open a space between the valve 6ᵇ and the gasket 10 which allows the air from the tank and the chamber 3 to pass between the thimble 8ᵃ and the valve 6ᵇ, through the gasket 10 between the pin 22 and the valve 8, up and around the head 22ᵃ of the pin 22, thence through the chamber 11ᵃ and passage 12 downwardly around the coil B into the chamber 4 and past the valve 14 and cup leather 14ᵃ into the chamber 5, thence through the port 26 to the brake cylinder, from which point the application is made in the usual manner. The valves above mentioned may be returned to their normal position by increasing the pressure in the train-line, and the chamber 2, above that in chamber 3.

Emergency application is made by venting the train line enough to cause the pressure above the valves 6 to force it downwardly far enough for the pin head 22ᵃ to draw the valve 8 along with it and thereby opening up the larger passage from the chamber 3 into the port 11ᵃ, which allows a greater volume of air than is necessary for a service application to flow on into the cylinders, taking the same path as described for service applications.

To release all the brakes after an application has been made, an increased pressure is applied to the train line from the compressor or storage tank on the engine. This increased pressure is somewhat higher than that in the chamber 3 and the auxiliary tank, enough so to shove the valve 6 to its uppermost position, in which position the valve 6ᵇ compresses the spring 7 and allows the pin 22 to move upwardly sufficiently far for the head 22ᵃ to strike the stem of the valve 13, raising it off its seat and allowing the air in the chamber 4 to escape through the passage 12, ports 11ᵇ and 13ᶜ, to the outer air. This escape of the air releases the pressure from the top of the valve 14 enough so as to allow the pressure from below to raise the said valve, together with the exhaust valve 15, thereby allowing the air in the chamber 5 and the brake cylinder to escape through the port 5ᵃ, thus allowing the brakes to be released in the usual manner.

To make a light application using the electrical apparatus, the pressure being the same as above described as normal, it is only necessary to throw the switch 28 to the point 34, thereby making a closed circuit through to the coil A, as previously described. Only enough current passes the resistance 33 to move the plunger 17 and the valve 6 into position, as described in the light application, no variation in the train line being necessary.

If an emergency application is desired, the switch 28 is thrown to the point 36, which closes the emergency circuit to the coil A with the result that the plunger 17 and valve 6 are both entirely down, as in the case of an emergency application with the air only. Pressure is supplied both from the auxiliary tank and from the train line, as when the pressure below the valve 6 is greater than above it the air flows past the valve, as previously pointed out, thereby keeping the auxiliary tank charged to the proper pressure at all times.

A release of the brakes is effected by bringing the switch 28 into contact with the point 39, which closes the release circuit to the coil B, said coil raising the valves 14 and 15, which opens the brake cylinder to the outer air, thereby allowing the air to escape the same as in an air release.

While I have shown a particular form and arrangement of my improved mechanism, I desire to avoid being limited to that exact form and arrangement as many changes therein will no doubt readily suggest themselves to others skilled in the art without departing from the spirit and scope of the invention.

Having described my invention, what I claim as new and desire to protect by Letters Patent is—

1. In a device of the class described, the combination with an air-brake system for trains which includes triple valves which embrace piston valves, of dual means for controlling the triple valves of the system, each of said dual means being operable independently of the other, and including solenoid magnets.

2. In a device of the class described, the combination with an air-brake system for trains which includes triple valves which embrace connected valves, including a piston valve and a secondary piston valve and a piston, of dual means for controlling the triple valves of the system, each of said dual means being operable independently of the other, said means including a pin which is fixed to the said piston valve and slidable with respect to the piston and said secondary piston valve, and a spring which holds the secondary piston valve normally seated with respect to the said piston valve, and which also holds the secondary piston valve seated with respect to the said piston.

3. In a device of the class described, the combination with an air-brake system for trains which includes triple valves which embrace connected valves, including a piston valve and a secondary piston valve and a piston, of dual means for controlling the triple valves of the system, each of said dual means being operable independently of the other, said means including a pin which is fixed to the said piston valve and slidable with respect to the piston and secondary piston valves, and a spring which holds the secondary piston valve normally closed with respect to the said piston valve, and which also holds the said secondary valve closed with respect to the piston, whereby the simultaneous operation of the piston valve and secondary of the said valves effects a light or service application and a similar operation of all of the said valves effects an emergency application.

4. In a device of the class described, the combination with an air-brake system for trains which includes triple valves, which embrace connected valves including a piston valve and a secondary piston valve and a piston, of dual means for controlling the triple valves of the system, each of said dual means being operable independently of the other, said means including a pin which is fixed to the said piston valve and slidable with respect to the said secondary piston valve and piston, and a spring which holds the secondary piston valve normally closed with respect to the piston valve, and which also holds the secondary piston valve closed with respect to the piston, a casing secured to the triple valve body, a magnet within the said casing, the plunger of said magnet being integral with the said piston valve, whereby when the said plunger is attracted to its magnet an emergency application is effected.

5. In a device of the class described, the combination with an air-brake system for trains which includes triple valves, which embrace connected valves, including a piston valve and a secondary piston valve and a piston, of dual means for controlling the triple valves of the system, each of said dual means being operable independently of the other, said means including a pin which is fixed to the said piston valve and slidable with respect to the piston and secondary piston valve, and a spring which holds the secondary piston valve normally closed with respect to the said piston valve, a casing secured to the triple valve body, a magnet within the said casing, the plunger of said magnet being integral with the said piston valve, there being a greater force required to cause an emergency than a light application, means for producing such variation of force, including a plurality of inter-dependent and normally open electrical circuits, a resistance coil in one of the said circuits and a switch for completing either of said circuits.

6. In an air-brake system for trains, the combination of triple valves which have piston valves consisting of a piston valve and a secondary piston valve, of means for electrically controlling the said valves of the said system including a magnetic coil, and means for energizing said coil to various degrees, including a pair of normally open and inter-dependent electrical circuits, a switch and a resistance coil in one of said circuits, whereby the secondary piston valve is caused to operate by a pre-determined degree of energization of the said magnet against the pressure of the impounded air and all of the said valves are caused to operate by a greater degree.

7. In an air-brake system for trains, the combination of triple valves, which have electrically operated valves consisting of a piston and a piston valve and a secondary piston, means for electrically controlling the said valves of the said system, including a magnetic coil, and means for energizing said coil to various degrees, including a pair of normally open and inter-dependent electrical circuits, a switch and a resistance coil in one of said circuits, whereby the secondary piston valve and piston valve are caused to operate by a pre-determined degree of energization of the said magnet and all of the said valves are caused to operate by a greater degree, release valves and magnetic coils for operating said valves, and means for energizing said coils, including a normally open circuit connected to said switch, whereby the said release valves are opened to allow the venting of the impounded air which venting release the brakes.

EDWARD R. HUMPHREY.

Witnesses:
  FRED P. GORIN,
  EMMA KROGER.

Copies of this patent may be obtained for five cents each, by addressing the "Commissioner of Patents, Washington, D. C."